United States Patent
Volpano et al.

(10) Patent No.: US 7,120,791 B2
(45) Date of Patent: Oct. 10, 2006

(54) BRIDGED CRYPTOGRAPHIC VLAN

(75) Inventors: Dennis Michael Volpano, Salinas, CA (US); Xinhua J. Zhao, Mountain View, CA (US)

(73) Assignee: Cranite Systems, Inc., Los Gatos, CA (US)

( * ) Notice: Subject to any disclaimer, the term of this patent is extended or adjusted under 35 U.S.C. 154(b) by 239 days.

(21) Appl. No.: 10/286,634

(22) Filed: Nov. 1, 2002

(65) Prior Publication Data

US 2003/0145118 A1 Jul. 31, 2003

Related U.S. Application Data

(63) Continuation-in-part of application No. 10/057,566, filed on Jan. 25, 2002.

(51) Int. Cl.
*H04L 9/00* (2006.01)

(52) U.S. Cl. .................. 713/153; 726/3; 726/12; 726/13

(58) Field of Classification Search ............. 713/153, 713/201; 709/218, 236, 249
See application file for complete search history.

(56) References Cited

U.S. PATENT DOCUMENTS

| | | | |
|---|---|---|---|
| 6,003,137 A | 12/1999 | Kawasaki | |
| 6,035,105 A | 3/2000 | McCloghrie et al. | |
| 6,035,405 A | 3/2000 | Gage et al. | |
| 6,085,238 A * | 7/2000 | Yuasa et al. | 709/223 |
| 6,181,699 B1 | 1/2001 | Crinion et al. | |
| 6,414,956 B1 * | 7/2002 | Szczepanek | 370/392 |
| 6,639,901 B1 * | 10/2003 | Katzri et al. | 370/255 |
| 6,728,249 B1 * | 4/2004 | Chang | 370/395.3 |
| 6,917,614 B1 | 7/2005 | Laubach et al. | |
| 2002/0027906 A1 * | 3/2002 | Athreya et al. | 370/386 |
| 2002/0091795 A1 * | 7/2002 | Yip | 709/218 |
| 2002/0163920 A1 * | 11/2002 | Walker et al. | 370/401 |
| 2002/0199021 A1 * | 12/2002 | Beier | 709/246 |
| 2003/0037169 A1 | 2/2003 | Kitchin | |
| 2004/0111520 A1 | 6/2004 | Krantz et al. | |

OTHER PUBLICATIONS

ABOBA (Microsoft), "Virtual Access Points", IEEE P802.11 Wireless LANs, (May 22, 2003), pp. 1-13.
Security Task Group of IEEE 802.1, Draft Standard for Local and Metropolitan Area Networks: Media Access Control (MAC) Security), IEEE P802.1AE/D5.1 (Jan. 19, 2006), pp. 1-150.
IEEE Computer Society, "IEEE Standards for Local and Metropolitan Area Networks: Virtual Bridged Local Networks," IEEE std 802.1Q 2003 Edition (May 7, 2003), pp. 1-312.

* cited by examiner

*Primary Examiner*—Kambiz Zand
(74) *Attorney, Agent, or Firm*—Townsend and Townsend and Crew LLP

(57) ABSTRACT

The invention comprises three extensions of the IEEE 802.1Q VLAN bridge model. The first extension is the cryptographic separation of VLANs over trunk links. A LAN segment type referred to as an encapsulated LAN segment is introduced. All frames on such a segment are encapsulated according to an encryption and authentication code scheme. The second extension is the division of a trunk port into inbound and outbound ports. The third extension is a protocol that automatically infers for each outbound port in a bridged VLAN, a set of LAN segment types for the port that minimizes the number of transfers between encapsulated and unencapsulated segments required to transport a frame in the bridged VLAN.

42 Claims, 3 Drawing Sheets

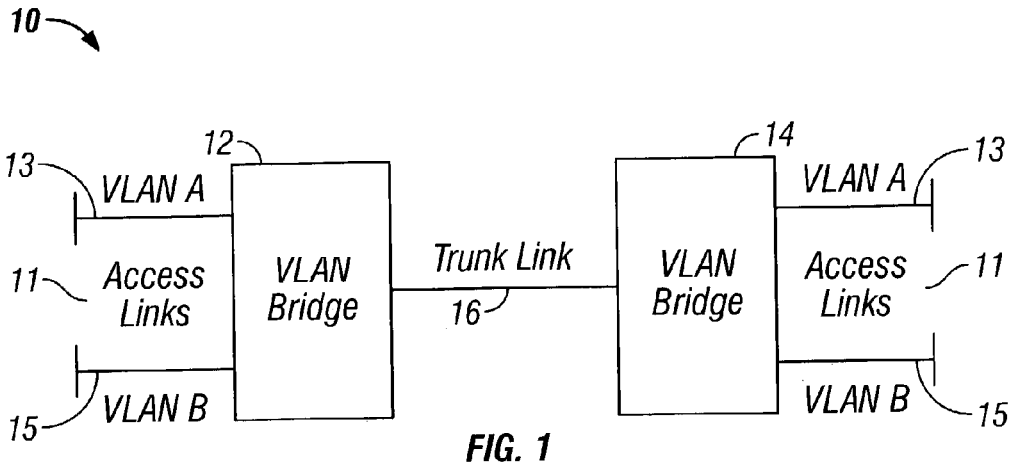
FIG. 1
*(Prior Art)*
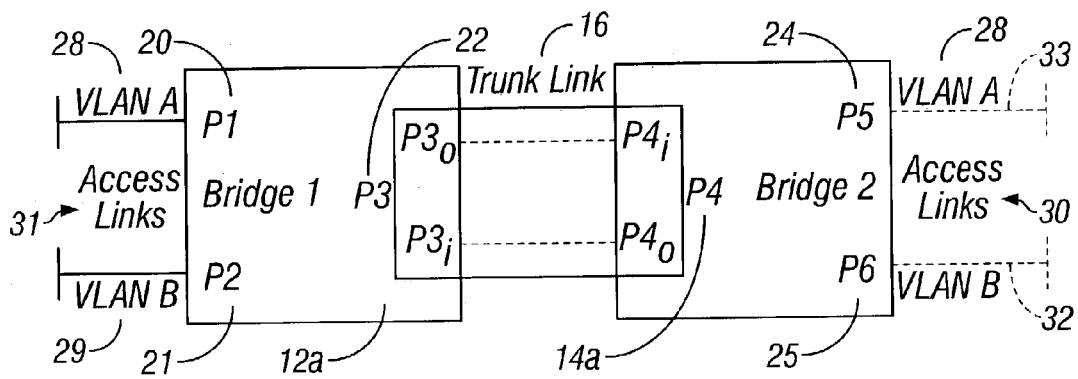
FIG. 2
|  | Egress Port | | |
| --- | --- | --- | --- |
|  | Untagged | Tagged | Encapsulated |
| Received Frame — Untagged | (1) | (2) | (3) |
| Received Frame — Tagged | (4) | (1) | (3) |
| Received Frame — Encapsulated | (5) | (6) | (1) |
FIG. 3

Bridge 1   [B,(1, {U-1, T-0, E-0})]

Bridge 2   [B,(1, {U-1, T-0, E-0}) (2, {U-0, T-0, E-1})]

Bridge 3

[B,(1, {U-1, T-0, E-0}), (2, {U-0, T-0, E-1}), (3, {U-0, T-0, E-1})]

[B,(1, {U-1, T-0, E-0}), (2, {U-0, T-0, E-1}), (3, {U-0, T-0, E-1})]

BRIDGED CRYPTOGRAPHIC VLAN

CROSS-REFERENCE TO RELATED APPLICATIONS

This application is a Continuation-in-Part of U.S. patent application Ser. No. 10/057,566, filed Jan. 25, 2002.

BACKGROUND OF THE INVENTION

1. Technical Field

The invention relates to VLANs. More particularly, the invention relates to a bridged cryptographic VLAN.

2. Description of the Prior Art

Basic VLAN Concepts

FIG. 1 shows a simple port-based VLAN 10, comprised of two VLANs, i.e. VLAN A 13 and VLAN B 15. The VLAN to which an untagged frame received at a port belongs is determined by the Port VLAN ID (PVID) assigned to the receiving port, or by the VLAN ID (VID) associated with the link-layer protocol carried in the frame (see IEEE Std 802.1v-2001, Virtual Bridged Local Area Networks—Amendment 2: VLAN Classification by Protocol and Port). There must be a way to convey VLAN information between the bridges 12, 14 because they are connected by a trunk link 16 that can carry frames from more than one VLAN. A VLAN tag is added to every frame for this purpose. Such frames are called VLAN-tagged frames.

Trunk Links

A trunk link is a LAN segment used for VLAN multiplexing between VLAN bridges (see IEEE Std 802.1v-2001, Virtual Bridged Local Area Networks—Amendment 2: VLAN Classification by Protocol and Port). Every device attached to a trunk link must be VLAN-aware. This means that they understand VLAN membership and VLAN frame formats. All frames, including end station frames, on a trunk link are VLAN-tagged, meaning that they carry a non-null VID. There can be no VLAN-unaware end stations on a trunk link.

The trunk link 16 in FIG. 1 is a multiplexed LAN segment shared by two bridges 12, 14. In general, many VLAN-aware bridges may be attached to a trunk link.

The access links 11 are LAN segments that do not multiplex VLANs. Instead, each access link carries untagged frames or VLAN-tagged frames belonging to a single VLAN. If frames are tagged then all frames on the segment carry the same VID and end stations on the LAN segment must be VLAN aware.

Various limitations are encountered with the current state of VLAN art. One problem is that of cryptographic separation of VLANs over trunk links. The introduction of a scheme to solve such problem itself raises the issue of efficient frame transfer between encrypted and unencrypted LAN segments which represent a single VLAN.

SUMMARY OF THE INVENTION

The invention comprises three extensions of the IEEE 802.1Q VLAN bridge model (see IEEE Std 802.1Q-1998, IEEE Standards for Local and Metropolitan Area Networks: Virtual Bridged Local Area Networks). The first extension is the cryptographic separation of VLANs over trunk links. A new LAN segment type, referred to herein as the encapsulated segment type, is introduced. All frames on such a segment are encapsulated according to an encryption and authentication-code scheme. The second extension is the division of a trunk port into inbound and outbound trunk ports. The third extension is a protocol, referred to herein as the Transfer Point Protocol (TPP), that automatically infers for each outbound trunk port in a bridged VLAN, a set of LAN segment types for the port that minimizes the number of transfers between encapsulated and unencapsulated segments required to transport a frame in the bridged VLAN.

BRIEF DESCRIPTION OF THE DRAWINGS

FIG. 1 is a block schematic diagram showing a port-based VLAN;

FIG. 2 is a block schematic diagram showing a bridged cryptographic VLAN according to the invention;

FIG. 3 is a flow diagram showing construction of a forwarding set according to the invention;

DETAILED DESCRIPTION OF THE INVENTION

LAN Segment Types

Figure 4:
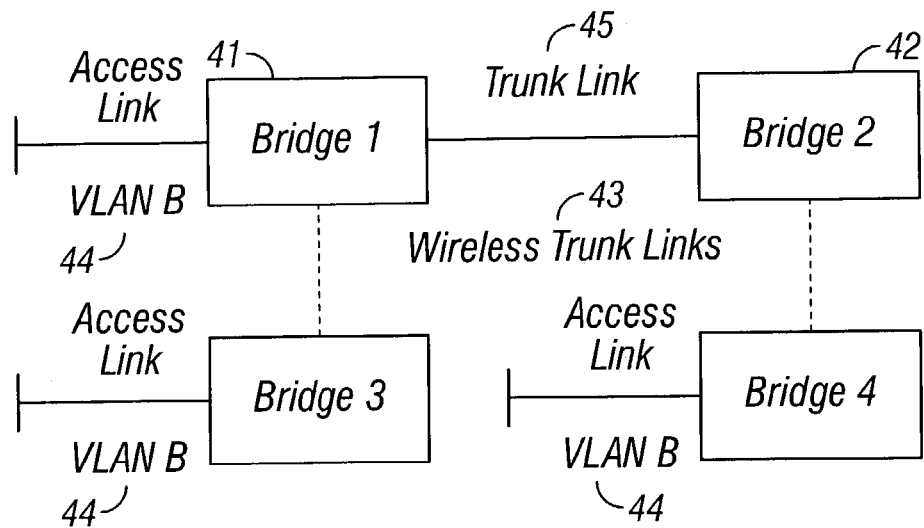
FIG. 4 is a block schematic diagram showing a bridged cryptographic VLAN with two wireless trunk links according to the invention.

Three types of LAN segments represent a VLAN: untagged, tagged, and encapsulated segments. The IEEE 802.1Q standard addresses only tagged and untagged segment types (see IEEE Std 802.1Q-1998, IEEE Standards for Local and Metropolitan Area Networks: Virtual Bridged Local Area Networks). The standard specifies bridging semantics only for the transfer of traffic between tagged and untagged segments representing the same VLAN. The invention provides a technique that extends the bridging semantics to include transferring traffic between an unencapsulated segment (tagged or untagged) and an encapsulated segment of the same VLAN. In general, any number of LAN segment types can be introduced.

There is one frame type for each type of segment representing a VLAN. There are three kinds of frames in a bridged, cryptographic VLAN: untagged, VLAN-tagged (also referred to as tagged), and encapsulated. The first two frame types are those of the IEEE 802.1Q standard (see IEEE Std 802.1Q-1998, IEEE Standards for Local and Metropolitan Area Networks: Virtual Bridged Local Area Networks). An encapsulated frame is cryptographically encapsulated. Every encapsulated frame also has a VLAN tag. The tag, however, is different from the tag used within tagged frames belonging to the VLAN. Associated with every VLAN are two unique VLAN tags, VID-T (used within tagged frames of the VLAN) and VID-E (used within encapsulated frames of the VLAN).

For each VLAN, there is a unique security association comprising a cryptographic authentication code key for checking the integrity and authenticity of frames that are tagged as belonging to the VLAN, and a cryptographic key for ensuring the privacy of all frames belonging to the VLAN.

The preferred encapsulation scheme is an "encrypt-then-MAC" scheme. In this scheme, the data payload of a frame is encrypted and then a message authentication code is computed over the resulting ciphertext and the frame's sequence number. This scheme has two major advantages: It facilitates forward error correction when used with certain block ciphers and modes of operation, and it permits frame authentication without decryption.

A tagged set, an untagged set, and an encapsulated set of ports is associated with each VLAN. The security association for a VLAN may be used to verify the authenticity and integrity of every frame tagged as belonging to the VLAN, and received at a port in the VLAN's encapsulated set. The ingress-filtering rule for the port determines whether verification occurs. The association may also be used to encapsulate tagged and untagged frames belonging to the VLAN cryptographically before sending them from a port in the VLAN's encapsulated set.

Trunk Ports

Every trunk port has an inbound and an outbound port. A trunk link between two trunk ports P1 and P2 connects the inbound port of P1 to the outbound port of P2, and the outbound port of P1 to the inbound port of P2. Therefore the sets of LAN segment types to which an inbound port belongs are exactly those of the outbound port to which it is connected. So, it is sufficient to assign only outbound ports to sets of LAN segment types in order to completely assign all trunk ports in a bridged VLAN to sets of LAN segment types.

The inbound and outbound ports of a trunk port can belong to different sets of LAN segment types. For instance, the outbound port of a trunk can belong to a VLAN's tagged set, and the inbound port to its encapsulated set, in which case, only encapsulated frames of the VLAN are received on the inbound port, and only tagged frames are ever sent from the outbound port.

Unlike an access port, the inbound or outbound port of a trunk port can belong to both the tagged and encapsulated sets of a VLAN simultaneously.

The division of a trunk port into inbound and outbound ports is absent in the 802.1Q standard (see IEEE Std 802.1Q-1998, IEEE Standards for Local and Metropolitan Area Networks: Virtual Bridged Local Area Networks) where, in effect, the inbound and outbound ports are the same port. Inbound and outbound frame types are therefore always the same for a given trunk port in 802.1Q.

FIG. 2 illustrates a bridged, cryptographic VLAN. Ports P1 (20) and P2 (21) are access ports, one for VLAN A 28, and the other for VLAN B 29, VLANs A and B having access links 30, 31. A trunk link 16 connects the two bridges 12a, 14a via trunk ports P3 (22) and P4 (23). P3 has inbound port $P3_i$ and outbound port $P3_o$. P4 has inbound port $P4_i$ and outbound port $P4_o$. $P4_i$ is connected to $P3_o$, and $P4_o$ is connected to $P3_i$. Frames received at P4 arrive on inbound port $P4_i$ and those sent out P4 leave via outbound port $P4_o$. Frames received at P3 arrive on inbound port $P3_i$ and those sent out P3 leave via outbound port $P3_o$.

Ports P5 (24) and P6 (25) are attached to wireless access links 30. In the preferred embodiment, they are actually virtual ports that share a single radio interface (access point) through which frames are sent and received via RF. VLANs A 28 and B 29 can be represented by different encapsulated segments even though they share the same RF medium. An end station in VLAN A, for example, can receive but not decipher any frame belonging to VLAN B. Therefore, distinct access links 32, 33 are shown for A and B even though their physical separation is only cryptographic.

Suppose P1 receives only untagged frames, and P2 only tagged frames. Further, suppose the trunk link carries tagged frames in both directions, and the wireless access links only encapsulated frames. Then for VLAN A, the untagged set is {P1}, the tagged set is {$P3_o$, $P3_i$, $P4_o$, $P4_i$} and the encapsulated set is {P5}; and for B the sets are { }, {P2, $P3_o$ $P3_i$, $P4_o$, $P4_i$}, and {P6} respectively.

If the ingress-filtering rule at P5 specifies authenticity checking, then a frame received at P5 is authenticated using the security association for VLAN A. If successful, then the frame is determined to be a member of the encapsulated segment for A. Suppose the frame must be forwarded to P4. Then Bridge 2 decapsulates the frame using the same security association. The bridge forwards the decapsulated frame to $P4_o$ with its tag replaced by A-T, thereby transferring the frame from A's encapsulated segment to its tagged segment. Conversely, frames arriving at $P4_i$, and destined for P5 are encapsulated using the security association for A. Tag A-T is replaced by A-E, which transfers the frame from A's tagged segment to its encapsulated segment.

There are many variations of the example in FIG. 2. For instance, it may be desirable to protect traffic on VLAN B only. In this case, P5 does not belong to the encapsulated set for A. Only frames received at P6, i.e. frames tagged with B-E, are authenticated, and only B-tagged frames received at P4, and destined for P6 are encapsulated.

Bridging Semantics

Consider a VLAN bridge having multiple ports. Suppose a frame is received at port P. It is assigned to a VLAN in one of several ways. If P is a trunk port, then the frame must carry a VLAN tag of the form VID-T or VID-E, each of which identifies a VLAN, namely VID. Otherwise, the frame is discarded. If P is not a trunk port, then either port or protocol-based VLAN classification can be used to assign the frame to a VLAN (see IEEE Std 802.1v-2001, Virtual Bridged Local Area Networks—Amendment 2: VLAN Classification by Protocol and Port).

Ingress Filtering

If P is a trunk port and is not in the tagged or encapsulated sets for VID, then the frame is discarded. The ingress-filter rule for a port may specify authentication and integrity checking for certain VLANs. If P is a port whose ingress filter rule requires authentication and integrity checking for the VLAN VID, then the frame received at P must have a VLAN tag VID-E. Otherwise, the frame is discarded. In the preferred embodiment, an authentication code is computed over the received frame's ciphertext and sequence number using the security association for VID. If it does not match the received authentication code in the frame, then the frame is discarded. Otherwise, the frame is judged to belong to the encapsulated segment for VID.

If P is not in the tagged set for VID, but it is attached to a VLAN-tagged access link, then the received frame is discarded.

Forwarding Process

The forwarding process begins by constructing the target port set Q. This is the set of ports to which a frame belonging to a particular VLAN must be forwarded. Suppose a frame received at port P belongs to the VLAN VID. If the frame must be flooded then Q contains any outbound or access port that is a member of the tagged, untagged, or encapsulated sets for VID. The next step is to shrink Q if, and only if, P is an inbound port of a trunk that belongs to both the tagged and encapsulated sets of VID. In this case, every port in the encapsulated set of VID that does not belong to the tagged set of VID is removed from Q if the received frame is a tagged frame, or every port in the tagged or untagged set of VID that does not belong to the encapsulated set of VID is removed from Q if the received frame is encapsulated. Because the inbound port belongs to both sets of LAN segment types for VID, the inbound port must receive a frame of each LAN segment type, and therefore shrinking the target port set is justified. The Transfer Point Protocol has the property that it guarantees shrinking never results in an empty target port set. Shrinking to an empty target set implies the bridge received a frame that it has no reason to receive.

The next step in the forwarding process is to construct a forwarding set for the received frame. This is the set of frames to be forwarded as a result of receiving the frame belonging to VID at port P. These are the frames necessary to transfer traffic from one LAN segment of the VLAN to another. The table shown in FIG. 3 is used to construct forwarding sets. The frame received at P belongs to a kind K of LAN segment for VID (tagged, untagged, or encapsulated). Likewise, every port in Q belongs to a kind of LAN segment, the kind of port set to which it belongs for VID. Trunk ports may have two kinds of sets: tagged and encapsulated. For every port q in Q, add a frame to the forwarding set according to rule (K, K') in the table of FIG. 3, where K' is a kind of port set to which q belongs for VID.

The rules for constructing the forwarding set for a received frame are as follows:

(1) Add received frame to forwarding set.
(2) Add VLAN tag VID-T to received frame; add the result to forwarding set.
(3) Received frame is cryptographically encapsulated using the security association for VID; resulting frame is VLAN tagged with VID-E and added to forwarding set.
(4) Remove VID-T from received frame; add untagged frame to forwarding set.
(5) Received frame's ciphertext is decrypted using the security association for VID; resulting frame is untagged and added to forwarding set.
(6) Received frame's ciphertext is decrypted using the security association for VID; resulting frame is tagged with VID-T and added to forwarding set.

In the presently preferred embodiment, there can be at most three frames in any forwarding set, corresponding to the three different kinds of LAN segments that can represent a VLAN. The forwarding process forwards the frames of the forwarding set as follows:

The forwarding process queues for transmission at each port in Q that belongs to the untagged set for VID, the untagged frame, if any, in the forwarding set.

The forwarding process queues for transmission at each port in Q that belongs to the tagged set for VID, the VLAN-tagged frame, if any, in the forwarding set.

The forwarding process queues for transmission at each port in Q that belongs to the encapsulated set for VID, the encapsulated frame, if any, in the forwarding set.

Frame Transfer

Within a bridged, cryptographic VLAN, steps are taken to eliminate redundant transfers between LAN segments representing the same VLAN. For instance, it is desirable to avoid transferring an unencapsulated frame to a VLAN's encapsulated segment more than once in a bridged VLAN because each transfer requires encryption. Encapsulation should be done once and shared by all egress ports that belong to the VLAN's encapsulated set across all bridges. Similarly, it is desirable to avoid repeated decapsulation across bridges because each calls for decryption.

For instance, consider the bridged LAN in FIG. 4. Suppose the ports of Bridges 1 (41) and 2 (42) to which the wireless trunk links 43 are attached belong to the encapsulated set for VLAN B 44. If the trunk link 45 carries only VLAN-tagged frames, then frames belonging to VLAN B that are received at Bridge 1 must be encapsulated at Bridges 1 and 2. However, if the trunk link carries encapsulated frames then encapsulation need only be done at Bridge 1 and shared with Bridge 2.

There are also situations where encapsulation can be done too early in a bridged LAN, forcing encapsulated frames to be sent over trunk links unnecessarily. There is a transfer point for encapsulation and decapsulation for each VLAN that minimizes cryptographic operations. The Transfer Point Protocol (discussed below) infers this transfer point between segments.

Transfer Point Protocol

A minimum spanning tree algorithm can reduce any bridged LAN to a spanning tree whose nodes are the bridges and whose edges are trunk links. A spanning tree induces a partial order on bridges. For instance, we can take as the partial order B1<B2, where bridge B1 is the parent of B2 in the spanning tree. The least bridge is the root of the spanning tree. The set of bridges together with the partial order defines a complete, partially ordered set. Every nonempty subset of bridges has a least upper bound.

Consider frames received at the root of the spanning tree. The least upper bound of all bridges requiring a received frame of a VLAN to belong to one of the LAN segments representing the VLAN is the transfer point for converting received frames to frames for that LAN segment.

The Transfer Point Protocol (TPP) comprises two link-layer protocols, TPP-T for adding outbound trunk ports to the tagged set of a VLAN, and TPP-E for adding outbound trunk ports to the encapsulated set of a VLAN. The trunk ports are across all bridges that bridge the VLAN. For example, TPP-E determines that the outbound trunk port connecting Bridge 1 to Bridge 2 in FIG. 4 must be a member of the encapsulated set for VLAN B. That way the wireless trunk port at Bridge 2 can share encapsulations performed by Bridge 1 for its outbound wireless trunk port.

TPP assumes that every access link port has been assigned to the tagged, untagged, or encapsulated set for a VLAN prior to execution because it uses this information to infer the sets to which outbound trunk ports in the bridged VLAN belong. TPP-E can assign an outbound trunk port to the encapsulated set of a VLAN, while TPP-T can assign the same outbound port to the tagged set of the VLAN.

TPP has two frames types, the announce frame, and the reply frame. Each of these frames contains a VLAN ID and a source bridge routing path, where each entry in the path is a unique pair containing a bridge MAC address and three bits, one bit for each LAN segment type, i.e. tagged, untagged, and encapsulated. The tagged bit is high if and only if the bridge addressed in the pair has an access port in the tagged set of the VLAN named in the frame. The untagged and encapsulated bits are set likewise.

A bridge sends a TPP announce frame, e.g. a GARP PDU, to a TPP group address, e.g. a GARP application address, through each of its outbound trunk ports for every VLAN known to it. When a bridge receives an announce frame, it appends to the right of the path the pair for itself regarding the named VLAN received, and forwards the frame to each of its enabled, outbound trunk ports except the receiving trunk port. If it has no other such ports, then it sends the final routing path and received VID in a TPP reply frame to the MAC address that precedes it in the routing path. The originating bridge of an announce frame creates a path consisting only of a pair for itself. When a bridge receives a TPP reply frame on an inbound trunk port, it forwards the reply frame to the bridge MAC address that precedes it in the path. If there is none, the frame is discarded.

TPP-E

When a bridge receives a TPP reply frame on a trunk port, it adds the trunk's outbound port to the encapsulated set for the VID in the frame if, and only if, it is followed by a bridge B in the routing path whose encapsulated bit is high, and either a) the receiving bridge has a tagged or untagged access port for the VID and no bridge after it in the routing path, up to and including B, has a high tagged or untagged bit; or b) the receiving bridge has an encapsulated access port for the VID, or is preceded by a bridge in the routing path with a high encapsulated bit.

TPP-T

When a bridge receives a TPP reply frame on a trunk port, it adds the trunk's outbound port to the tagged set for the VID in the frame if, and only if, it is followed by a bridge B in the routing path whose tagged or untagged bit is high, and either a) the receiving bridge has an encapsulated access port for the VID and no bridge after it in the routing path, up to and including B, has a high encapsulated bit; or b) the receiving bridge has a tagged or untagged access port for the VID, or is preceded by a bridge in the routing path with a high tagged or untagged bit.

EXAMPLES

Example 1

Consider bridging a single VLAN. Each access port therefore is assumed to belong to this VLAN. Thus, VLAN labeling of ports is omitted in the examples. Instead, the outbound trunk ports are labeled with LAN segment types, i.e. T (tagged), U (untagged), and E (encapsulated). If an outbound port is labeled with U, for example, then the port belongs to the untagged set of the VLAN.

Figure 5:
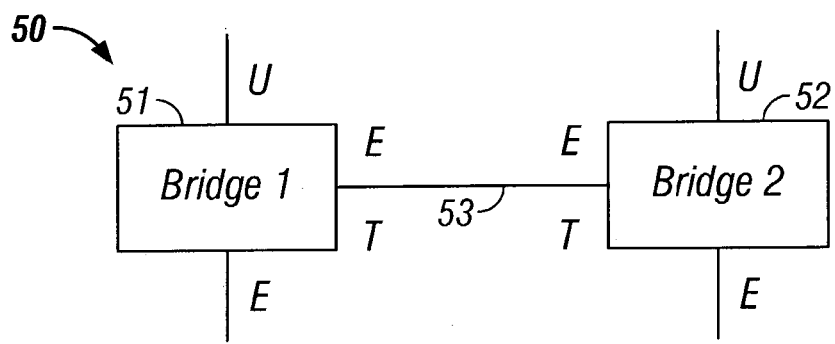
FIG. 5 is a block schematic diagram showing a symmetric labeling of outbound ports in a bridged cryptographic VLAN according to the invention.

Initially, every access port is labeled according to the kind of set to which the port belongs for the VLAN. Trunk ports are initially unlabeled. It is the job of TPP to infer labels for them. FIG. 5 shows a bridging of a VLAN 50 where two bridges 51, 52 are connected by a trunk 53. Each bridge has two access ports. Because each bridge has both untagged and encapsulated access ports, TPP infers that both outbound ports of the trunk belong to the tagged and encapsulated sets of the VLAN. Each inbound port also belongs to these sets.

Each outbound port is a member of the tagged set per rule TPP-T (b). Each bridge infers this fact when it initiates a TPP announce frame. Therefore, both the encryption and decryption done by each bridge is shared with the other.

Example 2

Figure 6:
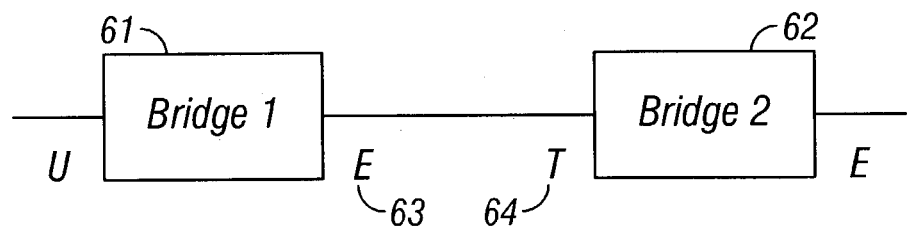
FIG. 6 is a block schematic diagram showing an asymmetric labeling of outbound ports in a bridged cryptographic VLAN according to the invention.

In FIG. 6, Bridge 1 (61) has an untagged access port and Bridge 2 (62) has an encapsulated access port. Therefore, the outbound port 63 of Bridge 1 is a member of the encapsulated set per rule TPP-E (a) whereas the outbound port 64 of Bridge 2 is a member of the tagged set per rule TPP-T (a).

Example 3

Figure 7:
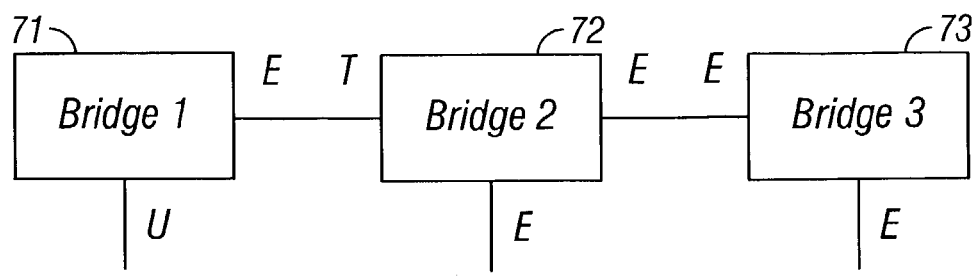
FIG. 7 is a block schematic diagram showing a purely encapsulated trunk in a bridged cryptographic VLAN according to the invention.

FIG. 7 illustrates a purely encapsulated trunk link. All frames over the link are encapsulated, however, no encryption is done at Bridges 2 or 3.

Figure 8:
FIG. 8 is a flow diagram showing TPP message exchange when Bridge 1 of FIG. 7 initiates an announce frame for the VLAN according to the invention.
Figure 8:
Figure 8:
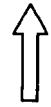
Figure 8:
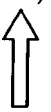

FIG. 8 shows the TPP message exchange between Bridges 1 (71), 2 (72), and 3 (73) when Bridge 1 (71) of FIG. 7 initiates an announce frame for the VLAN, which we assume for the example is named "B".

Example 4

Figure 9:
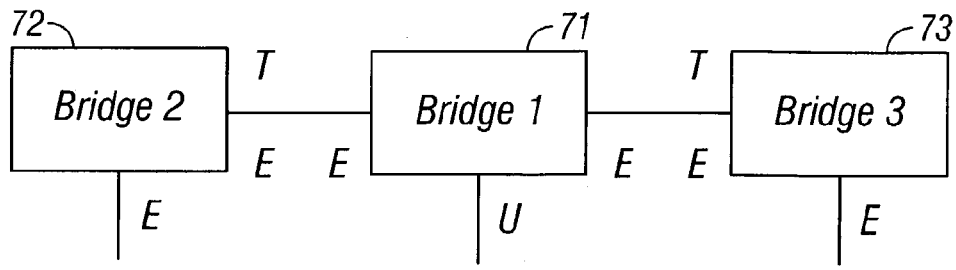
FIG. 9 is a block schematic diagram showing a labeling of the outbound ports, according to the invention, after swapping Bridges 1 and 2 in FIG. 7.

If Bridges 1 (71) and 2 (72) in FIG. 7 are interchanged, the result is the bridged cryptographic VLAN of FIG. 9.

Example 5

Figure 10:
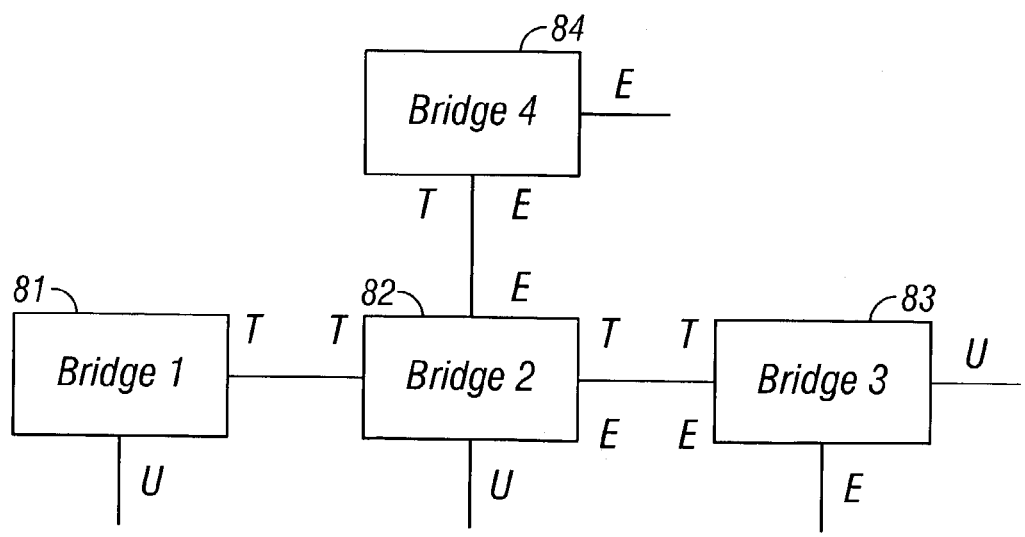
FIG. 10 is a block schematic diagram showing a labeling of the outbound ports, according to the invention, in a bridged cryptographic VLAN containing a bridge with three trunk ports.

FIG. 10 shows a bridge 82 with three trunk ports, each connected to another bridge 81, 83, 84. The outbound port of the trunk from Bridge 4 (84) belongs to the tagged and encapsulated sets, whereas the outbound port of Bridge 2 (82) that is connected to the inbound port of Bridge 4 is only a member of the encapsulated set.

TPP may run repeatedly to infer changes in transfer points. How frequently it runs and the number of bridges it affects depends on the displacement of access links. For example, if an end station is wireless, then movement of the station with respect to the bridged LAN can result in its encapsulated access link being relocated. Until TPP is rerun, there may be redundant transfers for a VLAN.

A bridged VLAN may consist of bridges that do not participate in TPP. In general, there may be one or more cryptographic VLAN bridges with trunk ports connected to legacy VLAN bridges. If each such trunk port is viewed instead as a collection of virtual, tagged access ports, one port for each VLAN tag that can be sent over the trunk, then TPP can still be run to infer transfer points among participating bridges. However, there may be redundant transfers across the entire bridged LAN. For example, if a nonparticipating core switch were to separate two cryptographic VLAN bridges, each having an access port in the encapsulated set of the same VLAN, then traffic between these encapsulated segments would be decrypted upon entry to the core and then re-encrypted after exiting. Observe that no encryption or decryption is needed if there are no access ports in the core that belong to the tagged or untagged sets of the VLAN. In this case, TPP can treat the virtual access port for each VLAN tag as an encapsulated access port rather than a tagged access port. Then all traffic between the two encapsulated segments can traverse the core transparently as encapsulated frames because every encapsulated frame is a VLAN-tagged frame.

Group Security

A cryptographicVLAN v is defined by a group of m stations that has a unique security association. The association consists of the following:
a) an encryption key $K_v$,
b) an authentication code key $K'_v$,
c) a distribution key $K''_v$, and
d) m random values $R_1, R_2, \ldots, R_m$.

The encryption key is a symmetric key used by v-aware bridges and stations of v to encrypt and decrypt frames belonging to v. All v-aware bridges, and stations of v, compute and verify authentication codes over encrypted frames of v using $K'_v$.

There is one random value for each of the m stations. The $i^{th}$ station of the group knows all m random values except $R_i$. The m−1 random values it knows are communicated to it by a v-aware bridge. Privacy of the random values is ensured by encryption using distribution key $K''_v$, while their authenticity is ensured by an authentication code computed over the resulting ciphertext using authentication code key $K'_v$.

Joining a Cryptographic VLAN

Joining a cryptographic VLAN is done with a two-step protocol:
adding a new station to the group, and
enabling all other stations in the group to eliminate the new station later.

A user's station joins a cryptographic VLAN v through a mutual authentication protocol executed between the user, via the station, and an authenticator residing on a v-aware bridge. If mutual authentication succeeds, a secure ephemeral channel is created between the bridge and the new station to transfer $K_v$, $K'_v$, and $R_1, R_2, \ldots, R_m$ securely from the bridge to the station. Then the second step of the join protocol executes. Otherwise, the protocol terminates immediately. In the second step, the same v-aware bridge chooses a new random value $R_{m+1}$ for the new station, and distributes it to all v-aware bridges, and stations comprising v, in a broadcast frame that is encrypted under $K''_v$ and carries an authentication code computed over the ciphertext using $K'_v$. The bridge then creates a new distribution key for v and distributes it to all v-aware bridges and to members of v, including the new station, in a broadcast frame that is encrypted under $K_v$ and carries an authentication code computed over the ciphertext using $K'_v$.

Although the new station can verify the authenticity of the broadcast containing its own random value $R_{m+1}$, it is unable to decrypt it because it does not hold key $K''_v$.

Leaving a Cryptographic VLAN

A subgroup of stations can simultaneously leave a cryptographic VLAN v, perhaps involuntarily. Suppose stations $1, \ldots, k$ of a group leave. When this happens, it is detected by a v-aware bridge which then announces the departure of stations $1, \ldots, k$ via a single broadcast frame that includes an authentication code computed over the frame using $K'_v$. The broadcast will notify every v-aware bridge and station in the group that stations $1, \ldots, k$ have left. Each such bridge and station then attempts to rekey the encryption, authentication code, and distribution keys for v, each as a function of the old key and the random values $R_1, \ldots, R_k$. Every v-aware bridge and all remaining stations in v will share a new security association as a result, including k fewer random values.

Every v-aware bridge always has the current distribution key for v, unlike a station. So every such bridge always has the complete set of random values for any subgroup that leaves v, thereby allowing it to always rekey the keys for v. The situation is different for stations however. Rekeying is a function of the random values for departing stations, values that these stations do not have. Therefore, they are unable to rekey. Furthermore, forward secrecy is guaranteed. A departed station can never become a member of v again as a result of subsequent rekeyings. This is because rekeying is a function of the current keys which means that all keys arrived at thereafter will always be a function of a random value unknown to the station. Only through rejoining v can the station ever become a member of v again.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for extending VLAN bridging semantics, comprising the steps of:
providing an untagged frame and a tagged frame in accordance with the IEEE 802.1Q VLAN bridge model;
providing a cryptographically encapsulated frame, which encapsulated frame is a tagged frame, having a VLAN tag that is different from all tags used within unencrypted tagged frames belonging to said VLAN;
providing a trunk port divided into inbound and outbound trunk ports;
providing one of said untagged, tagged, and encapsulated frame type for each segment representing a bridged, cryptographic VLAN; and
transferring traffic between an cryptographically unencapsulated segment (tagged or untagged) and an cryptographically encapsulated segment of a same VLAN; and
associating with every VLAN two unique VLAN tags, said two unique VLAN tags comprising VID-T, which is used within tagged, cryptographically unencapsulated frames of said VLAN, and VID-E, which is used within cryptographically encapsulated frames of said VLAN.

2. The method of claim 1, wherein a tagged set, an untagged set, and a cryptographically encapsulated set of ports are associated with each VLAN.

3. A method for extending VLAN bridging semantics, comprising the steps of:
providing an untagged frame and a tagged frame in accordance with the IEEE 802.1Q VLAN bridge model;
providing a cryptographically encapsulated frame, which encapsulated frame is a tagged frame, having a VLAN tag that is different from all tags used within unencrypted tagged frames belonging to said VLAN;
providing a trunk port divided into inbound and outbound trunk ports;
providing one of said untagged, tagged, and encapsulated frame type for each segment representing a bridged, cryptographic VLAN;
transferring traffic between an cryptographically unencapsulated segment (tagged or untagged) and an cryptographically encapsulated segment of a same VLAN; and wherein for each VLAN, there is a unique security association including comprising a cryptographic authentication code key for checking integrity and authenticity of frames that are tagged as belonging to said VLAN, and a cryptographic key for ensuring privacy of all frames belonging to said VLAN.

4. A method for extending VLAN bridging semantics, comprising the steps of:
providing an untagged frame and a tagged frame in accordance with the IEEE 802.1Q VLAN bridge model;
providing a cryptographically encapsulated frame, which encapsulated frame is a tagged frame, having a VLAN tag that is different from all tags used within unencrypted tagged frames belonging to said VLAN;
providing a trunk port divided into inbound and outbound trunk ports;
providing one of said untagged, tagged, and encapsulated frame type for each segment representing a bridged, cryptographic VLAN; and
transferring traffic between an cryptographically unencapsulated segment (tagged or untagged) and an cryptographically encapsulated segment of a same VLAN; and
wherein said cryptographically encapsulated frame is encapsulated in accordance with an encrypt-then-MAC method, which comprises the steps of:
encrypting a data payload of a frame; and
computing a message authentication code over a resulting ciphertext and said frame's sequence number.

5. A method for extending VLAN bridging semantics, comprising the steps of:
providing an untagged frame and a tagged frame in accordance with the IEEE 802.1Q VLAN bridge model;
providing a cryptographically encapsulated frame, which encapsulated frame is a tagged frame, having a VLAN tag that is different from all tags used within unencrypted tagged frames belonging to said VLAN;
providing a trunk port divided into inbound and outbound trunk ports;
providing one of said untagged, tagged, and encapsulated frame type for each segment representing a bridged, cryptographic VLAN;
transferring traffic between an cryptographically unencapsulated segment (tagged or untagged) and an cryptographically encapsulated segment of a same VLAN; and
using a security association for a VLAN to verify authenticity and integrity of every frame tagged as belonging to said VLAN, and received at a port in said VLAN's cryptographically encapsulated set.

6. The method of claim 5, further comprising the step of:
providing an ingress-filtering rule for said port to determine whether verification occurs.

7. The method of claim 5, further comprising the step of:
using said association to encapsulate tagged and untagged frames belonging to said VLAN cryptographically before sending them from a port in said VLAN's cryptographically encapsulated set.

8. An apparatus for sending frames in bridged, cryptographic VLANs, comprising:
at least two bridges;
a plurality of trunk links wherein every trunk link of said trunk links is associated with the inbound trunk port of one bridge of said at least two bridges and the outbound trunk port of another bridge of said at least two bridges;
a plurality of access ports;
a plurality of access links wherein every access link of said access links is associated with one access port of said access ports;
means for representing said VLANs by different cryptographically encapsulated segments even though they share a same medium, wherein physical separation of said VLANs is cryptographic; and
an ingress-filtering rule associated with at least one of said access ports for specifying authenticity checking, wherein a frame received at said one of said access ports is authenticated using a security association for an associated VLAN;
wherein, if authentication successful, then said frame is determined to be a member of a cryptographically encapsulated segment for said associated VLAN.

9. The apparatus of claim 8, wherein said ingress-filter rule associated with at least one of said access ports specifies authentication and integrity checking for certain of said VLANs.

10. The apparatus of claim 9, further comprising:
an authentication code that is computed over a received frame's ciphertext and sequence number using said security association;
wherein, if said authentication code does not match a received authentication code in said frame, then said frame is discarded; and
wherein said frame is otherwise determined to belong to a cryptographically encapsulated segment for an associated VLAN.

11. An apparatus for sending frames in bridged, cryptographic VLANs, comprising:
at least two bridges;
a plurality of trunk links wherein every trunk link of said trunk links is associated with the inbound trunk port of one bridge of said at least two bridges and the outbound trunk port of another bridge of said at least two bridges;
a plurality of access ports;
a plurality of access links wherein every access link of said access links is associated with one access port of said access ports;
means for representing said VLANs by different cryptographically encapsulated segments even though they share a same medium, wherein physical separation of said VLANs is cryptographic;
one or more rules for constructing a target port set for a frame received at an inbound port that belongs to the tagged and cryptographically encapsulated sets of a VLAN;
wherein, every port in the cryptographically encapsulated set of said VLAN that is not a member of the tagged set of said VLAN is removed if said frame is tagged; and
wherein, every port in either the tagged or untagged sets of said VLAN that is not a member of the cryptographically encapsulated set of said VLAN is removed if said frame is cryptographically encapsulated.

12. An apparatus for sending frames in bridged, cryptographic VLANs, comprising:
at least two bridges;
a plurality of trunk links wherein every trunk link of said trunk links is associated with the inbound trunk port of one bridge of said at least two bridges and the outbound trunk port of another bridge of said at least two bridges;
a plurality of access ports;
a plurality of access links wherein every access link of said access links is associated with one access port of said access ports;

means for representing said VLANs by different cryptographically encapsulated segments even though they share a same medium, wherein physical separation of said VLANs is cryptographic, one or more rules for constructing a forwarding set for a received frame, which rules may comprise any of the following;

add a received frame to said forwarding set;

add a VLAN tag to a received frame; add the result to said forwarding set;

a received frame is cryptographically encapsulated using a security association;

a resulting frame is VLAN tagged and added to said forwarding set;

remove a VLAN tag from a received frame; add an untagged frame to said forwarding set;

a received frame's ciphertext is decrypted using a security association; a resulting frame is untagged and added to said forwarding set; and a received frame's ciphertext is decrypted using a security association;

a resulting frame is tagged and added to said forwarding set.

13. An apparatus for implementing a transfer point protocol (TPP) in a bridged, cryptographic VLAN, comprising:

at least two bridges;

a plurality of trunk links wherein every trunk link of said trunk links is associated with an inbound trunk port of one bridge of said at least two bridges and an outbound trunk port of another bridge of said at least two bridges;

a plurality of access ports;

a plurality of access links wherein every access link of said access links is associated with one access port of said access ports;

means for representing said VLANs by different cryptographic encapsulated segments even though they share a same medium, wherein physical separation of said VLANs is cryptographic;

two link-layer protocols, a first link-layer protocol (TPP-T) for adding outbound ports to the tagged set of a VLAN, and a second link-layer protocol (TPP-E) for adding outbound ports to the encapsulated set of a VLAN; and wherein every access port is assigned to a tagged, untagged, or encapsulated set for a VLAN prior to execution;

two frames types, one of said frame types comprising an announce frame, and a second of said frame types comprising a reply frame; wherein each of said frames contains a VLAN ID and a source bridge routing path, where each entry in said path is a unique pair containing a bridge MAC address and three bits, one bit for each LAN segment type, wherein said tagged bit is high if and only if a bridge addressed in said pair has an access port in a tagged set of said VLAN named in said frame, and wherein said untagged and encapsulated bits are set likewise.

14. A transfer point protocol (TPP) in a bridged, cryptographic VLAN, comprising the steps of:

a bridge sending a TPP announce frame to a TPP group address through each of its trunk ports for every VLAN known to it;

when a bridge receives an announce frame on an inbound trunk port, said bridge appending to received routing path an entry for itself regarding the received VLAN ID, and forwarding said frame to each of its enabled, outbound trunk ports except the receiving inbound trunk port; wherein if said bridge has no other such trunk ports, then said bridge sending a final routing path and said received VLAN ID in a TPP reply frame to the MAC address that precedes said bridge in said routing path;

an originating bridge of an announce frame creating a path consisting only of an entry for itself;

when a bridge receives a TPP reply frame, said bridge forwarding said reply frame to the bridge MAC address that precedes said bridge in said routing path: and if there is none, discarding said frame; and wherein when a bridge receives a TPP reply frame on an inbound trunk port, said bridge adds the outbound port corresponding to said inbound trunk port to the encapsulated set for the VLAN ID in said frame if, and only if, said bridge is followed by another bridge in said routing path with an encapsulated access port, and either;

said bridge has a tagged or untagged access port for said VLAN ID and no bridge after it in said routing path, up to an including said other bridge, has a tagged or untagged access port; or said bridge has an encapsulated access port for said VLAN ID, or said bridge is preceded by another bridge in said routing path with an encapsulated access port.

15. The protocol of claim 14, wherein when a bridge receives a TPP reply frame on an inbound trunk port, said bridge adds the outbound port corresponding to said inbound trunk port to the tagged set for the VLAN ID in said frame if, and only if, said bridge is followed by another bridge in said routing path with a tagged or untagged access port, and either:

said bridge has an encapsulated access port for said VLAN ID and no bridge after it in said routing path, up to an including said other bridge, has an encapsulated access port; or said bridge has a tagged or untagged access port for said VLAN ID, or said bridge is preceded by another bridge in said routing path with a tagged or untagged access port.

16. The protocol of claim 14, wherein the outbound port of a trunk port is treated as:

a set of virtual, tagged access ports with one said tagged access port for each VLAN supported by said trunk port;

a set of virtual, encapsulated access ports with one said encapsulated access port for each VLAN supported by said trunk port; or a set of virtual, encapsulated or virtual, tagged access ports with one said tagged or encapsulated access port for each VLAN supported by said trunk port.

17. A method for establishing a group security association for a cryptographic VLAN comprising m stations, comprising the steps of:

providing an encryption key Kv, wherein said encryption key is a symmetric key used by v-aware bridges and stations of v to encrypt and decrypt frames belonging to v, providing an authentication code key K¢ v, wherein all v-aware bridges, and stations of v, compute and verify authentication codes over encrypted frames of v using K¢ v, providing a distribution key K¢¢ v; and providing m random values R1, R2, . . . , Rm, wherein there is one random value for each of said m stations, wherein an ith station of said group knows all m random values except Ri, wherein said m−1 random values that said ith station knows are communicated to it by a v-aware bridge;

wherein privacy of said random values is ensured by encryption using said distribution key K¢¢ v, while their authenticity is ensured by an authentication code computed over a resulting ciphertext using said authentication code key K¢ v.

18. A method for joining an encrypted segment of a cryptographic VLAN, comprising the steps of:
adding a new station to a group;
distributing encryption key material to the new station; enabling all other stations in said group to eliminate said new station later by at least a subset of the other stations rekeying without every station so doing; and
the step of adding a new station to a group further comprising the step of:
a user's station joining a cryptographic VLAN v through a mutual authentication protocol executed between said user, via said user's station, and an authenticator residing on a v-aware bridge;
wherein if mutual authentication succeeds, a secure ephemeral channel is created between said v-aware bridge and said new station to transfer an encryption key Kv , an authentication code key K¢ v, and m random values R1, R2, . . . , Rm securely from said v-aware bridge to said new station, in which case said enabling step executes;
otherwise, said protocol terminates immediately.

19. The method of claim 18, said step of enabling all other stations in said group to eliminate said new station later further comprising the steps of:
said v-aware bridge choosing a new random value Rm+1 for said new station, and distributing said new random value Rm+1 to all v-aware bridges, and stations comprising v, in a broadcast frame that is encrypted under a distribution key K¢¢ v and that carries an authentication code computed over ciphertext using K0 v;
said bridge then creating a new distribution key for v and distributing said new distribution key to all v-aware bridges and to members of v, including said new station, in a broadcast frame that is encrypted under Kv and that carries an authentication code computed over said ciphertext using K¢ v.

20. The method of claim 19, wherein said new station can verify authenticity of a broadcast containing its own random value Rm+1, but is unable to decrypt said broadcast because it does not hold key K¢¢ v.

21. A method for leaving a cryptographic VLAN, comprising the steps of:
detecting with a v-aware bridge a subgroup of stations 1, . . . , k simultaneously leaving a cryptographic VLAN v;
said bridge v-aware announcing the departure of said stations 1, . . . , k via a single broadcast frame that comprises an authentication code computed over said frame using an authentication code key K¢ v, wherein said broadcast notifies every v-aware bridge and station in group v that stations 1, . . . , k have left;
each such bridge and station then attempting to rekey encryption, authentication code, and distribution keys for v, each as a function of an old key and random values R1, . . . , Rk, and
every v-aware bridge and all remaining stations in v group v sharing a new security association as a result, comprising k fewer random values.

22. The method of claim 21, wherein every v-aware bridge always has a current distribution key for v; and wherein every v-aware bridge always has a complete set of random values for any subgroup that leaves group v, thereby allowing it to always rekey the keys for group v.

23. The method of claim 21, wherein for stations rekeying is a function of random values for departing stations that these stations do not have, wherein said stations are unable to rekey.

24. The method of claim 21, wherein a departed station can never become a member of group v again as a result of subsequent rekeyings because rekeying is a function of current keys, and all keys arrived at thereafter are always a function of a random value unknown to said departed station.

25. The method of claim 21, wherein a departed station can only become a member of v again by rejoining v.

26. A method for extending VLAN bridging semantics comprising:
providing an untagged frame and a tagged frame in accordance with the IEEE 802.1Q VLAN bridge model;
providing a cryptographically encapsulated frame, which encapsulated frame is a tagged frame, having a VLAN tag that is different from all tags used within unencrypted tagged frames belonging to the VLAN;
providing a trunk port divided into inbound and outbound trunk ports;
providing one of the untagged, tagged, and encapsulated frame type for each segment representing a bridged, cryptographic VLAN;
transferring traffic between an unencapsulated segment (tagged or untagged) and an encapsulated segment of a same VLAN; and
associating with every VLAN a unique security association including a cryptographic authentication code key for checking integrity and authenticity of frames that are tagged as belonging to the VLAN, and a cryptographic key for ensuring privacy of all frames belonging to the VLAN.

27. The method of claim 26 wherein the encapsulated frame is encapsulated in accordance with an encrypt-then-MAC method comprising:
encrypting a data payload of a frame; and
computing a message authentication code over a resulting ciphertext and the frame's sequence number.

28. The method of claim 27 wherein a tagged set, an untagged set, and an encapsulated set of ports is associated with each VLAN.

29. The method of claim 26 further comprising using a security association for a VLAN to verify authenticity and integrity of every frame tagged as belonging to the VLAN, and received at a port in the VLAN's encapsulated set.

30. The method of claim 29 further comprising providing an ingress-filtering rule for the port to determine whether verification occurs.

31. The method of claim 29 further comprising using the association to encapsulate tagged and untagged frames belonging to the VLAN cryptographically before sending them from a port in the VLAN's encapsulated set.

32. An apparatus for sending frames in bridged cryptographic VLANs, the apparatus comprising:
at least two bridges;
a plurality of trunk links wherein each trunk link is associated with an inbound trunk port of one bridge and an outbound trunk port of another bridge;

a plurality of access ports;
a plurality of access links each of which is associated with one access port of the access ports; and
means for representing the VLANs by different encapsulated segments even though they share a same medium, wherein physical separation of the VLANs is cryptographic; and
an ingress-filtering rule associated with at least one of the access ports for specifying authenticity checking, wherein a frame received at the one of the access ports is authenticated using a security association for an associated VLAN, wherein, if authentication successful, then the frame is determined to be a member of an encapsulated segment for the associated VLAN.

33. The apparatus of claim 32 wherein the ingress-filter rule associated with at least one of the access ports specifies authentication and integrity checking for certain of the VLANs.

34. The apparatus of claim 33 further comprising:
an authentication code that is computed over a received frame's ciphertext and sequence number using the security association;
wherein, if the authentication code does not match a received authentication code in the frame, then the frame is discarded; and
wherein the frame is otherwise determined to belong to an encapsulated segment for an associated VLAN.

35. The apparatus of claim 32 further comprising:
one or more rules for constructing a target port set for a frame received at an inbound port that belongs to the tagged and encapsulated sets of a VLAN;
wherein, every port in the encapsulated set of the VLAN that is not a member of the tagged set of the VLAN is removed if the frame is tagged; and
wherein, every port in either the tagged or untagged sets of the VLAN that is not a member of the encapsulated set of the VLAN is removed if the frame is encapsulated.

36. The apparatus of claim 32 further comprising:
one or more rules for constructing a forwarding set for a received frame, which rules may comprise any of the following:
add a received frame to the forwarding set;
add a VLAN tag to a received frame; add the result to the forwarding set;
a received frame is cryptographically encapsulated using a security association;
a resulting frame is VLAN tagged and added to the forwarding set;
remove a VLAN tag from a received frame; add an untagged frame to the forwarding set;
a received frame's ciphertext is decrypted using a security association; a resulting frame is untagged and added to the forwarding set; and
a received frame's ciphertext is decrypted using a security association;
a resulting frame is tagged and added to the forwarding set.

37. An apparatus for implementing a transfer point protocol (TPP) in a bridged cryptographic VLAN comprising:
at least two bridges;
a plurality of trunk links wherein each trunk link is associated with an inbound trunk port of one bridge and an outbound trunk port of another bridge;
a plurality of access ports;
a plurality of access links, each access link being associated with one access ports;
means for representing the VLANs by different cryptographic encapsulated segments even though they share a same medium, wherein physical separation of the VLANs is cryptographic;
two link-layer protocols, a first link-layer protocol for adding outbound ports to the tagged set of a VLAN, and a second link-layer protocol for adding outbound ports to the encapsulated set of a VLAN; and
wherein every access port is assigned to a tagged, untagged, or a cryptographically encapsulated set for a VLAN, prior to execution,
two frames types, one of the frame types comprising an announce frame, and a second of the frame types comprising a reply frame; wherein each of the frames contains a VLAN ID and a source bridge routing path, where each entry in the path is a unique pair containing a bridge MAC address and at least three bits, one bit for each LAN segment type, wherein the tagged bit is set if and only if a bridge addressed in the pair has an access port in a tagged set of the VLAN named in the frame, and wherein the untagged and encapsulated bits are also set.

38. A transfer point protocol (TPP) in a bridged cryptographic VLAN in which a bridge sends a TPP announce frame to a TPP group address through each of its trunk ports for every VLAN known to it, comprising:
when a bridge receives an announce frame on an inbound trunk port, the bridge appends to a received routing path an entry for itself regarding the received VLAN ID, and forwards the frame to each of its enabled outbound trunk ports except the receiving inbound trunk port;
wherein if the bridge has no other such trunk ports, then the bridge sending a final routing path and the received VLAN ID in a TPP reply frame to the MAC address that precedes the bridge in the routing path;
an originating bridge of an announce frame creating a path consisting only of an entry for itself;
when a bridge receives a TPP reply frame, the bridge forwarding the reply frame to the bridge MAC address that precedes the bridge in the routing path; and if there is none, discarding the frame;
wherein when a bridge receives a TPP reply frame on an inbound trunk port, the bridge adds the outbound port corresponding to the inbound trunk port to the encapsulated set for the VLAN ID in the frame if, and only if, the bridge is followed by another bridge in the routing path with an encapsulated access port, and either:
the bridge has a tagged or untagged access port for the VLAN ID and no bridge after it in the routing path, up to an including the other bridge, has a tagged or untagged access port; or
the bridge has an encapsulated access port for the VLAN ID, or the bridge is preceded by another bridge in the routing path with an encapsulated access port.

39. The protocol of claim 38 wherein when a bridge receives a TPP reply frame on an inbound trunk port, the bridge adds the outbound port corresponding to the inbound trunk port to the tagged set for the VLAN ID in the frame if, and only if, the bridge is followed by another bridge in the routing path with a tagged or untagged access port, and either:
the bridge has an encapsulated access port for the VLAN ID and no bridge after it in the routing path, up to an including the other bridge, has an encapsulated access port; or the bridge has a tagged or untagged access port for the VLAN ID, or the bridge is preceded by another bridge in the routing path with a tagged or untagged access port.

40. The protocol of claim 38 wherein the outbound port of a trunk port is treated as:
   a set of virtual, tagged access ports with one the tagged access port for each VLAN supported by the trunk port;
   a set of virtual, encapsulated access ports with one the encapsulated access port for each VLAN supported by the trunk port; or
   a set of virtual, encapsulated or virtual, tagged access ports with one the tagged or encapsulated access port for each VLAN supported by the trunk port.

41. A method for joining a segment of a cryptographic VLAN comprising:
   adding a new station to a group;
   enabling all other stations in the group to eliminate the new station later;
   a user's station joining a cryptographic VLAN v through a mutual authentication protocol executed between the user via the user's station, and an authenticator residing on a v-aware bridge;
   wherein if mutual authentication succeeds, a secure ephemeral channel is created between the v-aware bridge and the new station to transfer an encryption key Kv, an authentication code key K¢ v, and m random values R1, R2, . . . , Rm securely from the v-aware bridge to the new station, in which case the enabling step executes; and
   otherwise the protocol terminates immediately.

42. The method of claim 41 wherein the step of enabling all other stations in the group to eliminate the new station later comprises:
   the v-aware bridge choosing a new random value Rm+1 for the new station, and distributing the new random value Rm+1 to all v-aware bridges and stations comprising v in a broadcast frame that is encrypted under a distribution key K¢¢ v and that carries an authentication code computed over ciphertext using K0 v;
   the bridge then creating a new distribution key for v and distributing the new distribution key to all v-aware bridges and to members of v, including the new station, in a broadcast frame that is encrypted under Kv and that carries an authentication code computed over the ciphertext using K¢ v.

* * * * *